UNITED STATES PATENT OFFICE.

HENRY HOWARD, OF BROOKLINE, MASSACHUSETTS.

PROCESS OF TREATING ALUMINATE SOLUTIONS.

1,137,860.   Specification of Letters Patent.   Patented May 4, 1915.

No Drawing.   Application filed May 24, 1913.   Serial No. 769,615.

*To all whom it may concern:*

Be it known that I, HENRY HOWARD, a citizen of the United States, residing at Brookline, in the county of Norfolk and State of Massachusetts, have invented certain new and useful Improvements in Processes of Treating Aluminate Solutions, of which the following is a specification.

This invention relates to improvements in processes of treating aluminate solutions.

According to the well-known Bayer process, (U. S. Patents 382,505 and 515,895), aluminate lyes are decomposed in presence of aluminum hydrate, yielding a precipitate of aluminum hydrate, and an alkaline mother-liquor which is capable of use, after concentration to about 43° Baumé, for treatment of bauxite for the preparation of further quantities of the aluminate lye. The undissolved residue from this treatment of bauxite with the alkaline mother-liquor is technically known as "red mud residue," and is separated by filtration from the aluminate lyes before decomposing the latter.

In the practice of the Bayer process small proportions of silica are dissolved, and a part of this silica is liable to precipitation with the aluminum hydrate, so that it has at times been found difficult to keep the silica-content of the precipitated aluminum hydrate below 0.2 or 0.3 per cent.

I have discovered that the red mud residues of the Bayer process possess, under certain conditions, a remarkable capability for removing silica from aluminate lyes, and that by suitable treatment of the crude aluminate lyes with the red mud residues I am able so fully to remove the silica therefrom that the hydrate alumina thereafter precipitated by the usual methods contains only minute traces of silica. The best conditions for thus removing the silica, so far as now known are as follows:—The product obtained according to the Bayer process by heating bauxite with the suitably concentrated alkaline mother-liquor from which alumina has been precipitated, said product consisting essentially of a strong aluminate lye containing dissolved silica and mixed with the red mud residues, is diluted with water, preferably to 23° to 25° Baumé when hot. In this diluted state it is then heated for about one-half hour by injected live steam or otherwise to approximately 100° C., or to any suitable higher or lower temperature, preferably with mechanical stirring to keep the red mud residues in suspension. Under this treatment, the dissolved silica is removed with substantial completeness. The solution is then filtered, and the aluminum hydrate precipitated in the usual way. As a result of the treatment described, aluminum hydrate containing only 0.02 per cent. to 0.04 per cent. of silica is readily obtained.

The object of diluting the liquor is primarily to destroy the equilibrium which was established by digesting the bauxite in presence of highly concentrated aluminate of soda or caustic soda solution, and thereby to permit the precipitation of the silica by the residues. A secondary advantage of the dilution is that it is thereby rendered practicable to filter the solution through ordinary filter-cloth, which would be quickly hardened and destroyed by the highly concentrated solution.

In place of the Bayer process residue, there may be used the red mud, or residue, left after the lixiviation of calcined aluminate of soda, or a mixture of this residue with the residue from the Bayer process.

The above-described method of removing silica is applicable to aluminate solutions or lyes produced in any manner.

I claim:—

1. The process of removing silica from aluminate solutions, which consists in diluting the solution to destroy the established equilibrium, and then subjecting the hot aluminate solution to the action of the residues from the decomposition of bauxite by alkali.

2. The process of removing silica from aluminate solutions, which consists in subjecting the hot aluminate solution, at a concentration not exceeding 30° Baumé, to the action of the residues from the decomposition of bauxite by alkali.

3. The process of removing silica from aluminate solutions, which consists in subjecting the hot aluminate solution, suitably diluted, to the action of the residues from the treatment of bauxite with alkaline aluminate solutions.

4. The process of removing silica from aluminate solutions, which consists in subjecting the hot aluminate solution, at a concentration not exceeding 30° Baumé, to the action of the residues from the treatment of bauxite with alkaline aluminate solutions.

5. In a process of making aluminum hydrate, the steps which consist in digesting bauxite with an alkaline-aluminate solution, and thereafter diluting the resulting aluminate solution and removing silica therefrom by further heating in presence of the undissolved residues.

6. In a process of making aluminum hydrate, the steps which consist in digesting bauxite with an alkaline-aluminate solution under pressure and at a temperature materially above 100° C., and thereafter diluting the resulting aluminate solution and removing silica therefrom by further heating in presence of the undissolved residues.

In testimony whereof I affix my signature in presence of two witnesses.

HENRY HOWARD.

Witnesses:
 C. P. TOWNSEND,
 JOS. H. BLACKWOOD.